(12) United States Patent
Bodell (10) Patent No.: US 9,096,107 B2
(45) Date of Patent: Aug. 4, 2015

(54) REGULATING DEVICE, RAILWAY WHEEL DEVICE, WORKING MACHINE AS WELL AS A METHOD FOR DRIVING OF A RUBBER WHEELED WORKING MACHINE ALONG A RAILWAY TRACK

(75) Inventor: Kjell-Åke Bodell, Hudiksvall (SE)

(73) Assignee: HUDDIG AKTIEBOLAG, Hudiksvall (SE)

( * ) Notice: Subject to any disclaimer, the term of this patent is extended or adjusted under 35 U.S.C. 154(b) by 22 days.

(21) Appl. No.: 13/640,876

(22) PCT Filed: Apr. 11, 2011

(86) PCT No.: PCT/SE2011/050438
§ 371 (c)(1),
(2), (4) Date: Nov. 29, 2012

(87) PCT Pub. No.: WO2011/129752
PCT Pub. Date: Oct. 20, 2011

(65) Prior Publication Data
US 2013/0087067 A1    Apr. 11, 2013

(30) Foreign Application Priority Data
Apr. 13, 2010    (SE) ...................................... 1050362

(51) Int. Cl.
*B60F 1/04*    (2006.01)
*E02F 9/02*    (2006.01)
*E02F 3/96*    (2006.01)

(52) U.S. Cl.
CPC . *B60F 1/04* (2013.01); *B60F 1/043* (2013.01); *E02F 3/963* (2013.01); *E02F 9/022* (2013.01); *B60F 2301/04* (2013.01)

(58) Field of Classification Search
CPC .............. B60F 1/043; B60F 1/04; B60F 1/00; B60F 1/005; B60F 2301/04; E02F 9/022
USPC ........................... 105/72.2, 215.2, 453, 199.2
See application file for complete search history.

(56) References Cited

U.S. PATENT DOCUMENTS

| | | | | |
|---|---|---|---|---|
| 3,701,323 A | * | 10/1972 | Cox ............................. | 105/72.2 |
| 5,103,740 A | | 4/1992 | Masse | |
| 5,141,245 A | * | 8/1992 | Kamimura et al. ........ | 280/5.514 |
| 7,243,606 B2 | * | 7/2007 | Hommen et al. ............. | 105/453 |

FOREIGN PATENT DOCUMENTS

WO    WO-9843838 A1    10/1998

OTHER PUBLICATIONS

International Search Report (PCT/ISA/210).

* cited by examiner

*Primary Examiner* — Mark Le
(74) *Attorney, Agent, or Firm* — Harness Dickey & Pierce, P.L.C.

(57) ABSTRACT

Example embodiments relate to a regulating device for a working machine including at least four rubber wheels and a railway wheel unit in the area of a forward and rearward end, respectively, of the working machine, which each include at least two railway wheels and of which at least one can be raised and lowered by way of at least one power generator. The regulating device includes a position regulator by which the power generator, in a driving position, is automatically controllable to maintain the railway wheels on a predetermined perpendicular distance from an arbitrary reference point on the chassis of the working machine. Example embodiments also relate to a railway wheel device, a working machine and a method for regulating the railway wheel unit.

12 Claims, 5 Drawing Sheets

REGULATING DEVICE, RAILWAY WHEEL DEVICE, WORKING MACHINE AS WELL AS A METHOD FOR DRIVING OF A RUBBER WHEELED WORKING MACHINE ALONG A RAILWAY TRACK

The present invention relates to a regulating device for a working machine of the kind which comprises at least four rubber wheels, of which at least two are drivable, for driving of the working machine on roads and in terrain, as well as a railway wheel unit in the area of the forward and rearward end, respectively, of the working machine, which each comprises at least two railway wheels and of which at least one can be raised and lowered by means of at least one power generating means to allow raising of the railway wheel unit, and by this allow driving of the working machine in roads and in terrain by means of the rubber wheels, as well as lowering of the railway wheel unit for bearing of the railway wheels against rails of a railway track during simultaneous bearing of also the rubber wheels against the rails for driving of the working machine on the railway track by guiding along the rails by means of the railway wheels and driving as well as breaking against the rails by means of the rubber wheels. The invention also relates to a railway wheel device, a working machine as well as a method.

BACKGROUND OF THE INVENTION

It is previously known to provide working machines of different kinds, which are provided with four or more rubber wheels to normally be driven on roads or in terrain, with railway wheel units in the forward and rearward ends to also allow driving of the working machine along a railway track. Thereby, the working machine is guided along the rails of the railway track by means of the railway wheels of the railway wheel units while at the same time the rubber wheels of the working machine bear against the upper surfaces of the rails and accomplish driving and braking of the working machine during travel along the railway track. One example of such a railway wheel unit is disclosed in SE 509478 in which a tractor loader or excavator loader has such a railway wheel unit mounted in its forward and rearward end, respectively.

However, there are some problems associated with such railway wheel units. For instance, the bearing pressure between the railway wheels and the rails has to be sufficient large such that the working machine doesn't derail. Moreover, the wear of the rubber wheels usually become comparatively large since their bearing surfaces against the upper sides of the rails become so small which deform the rubber wheels considerably in case the bearing pressure against the rails become too large. This wear can be reduced by transferring a relatively large part of the weight of the working machine from the rubber wheels to the railway wheels, which can be achieved by pressing the railway wheels harder against the rails by means of power generating means, e.g. hydraulic cylinders as in the embodiment according to said SE 509478. However, hereby it is important that the bearing pressure between the rubber wheels and the rails does not become too small since in such case the working machine will lose drive and brake power, which deteriorates the working capacity of the working machine and may create a potential dangerous situation if the working machine accidentally begins to move on the rails along the railway track. Since the working machine in addition normally also is equipped with some form of working tool, such as e.g. an excavating unit, a loading bucket or a work platform on a lifting arm, the bearing pressure between the rubber wheels and the rails as well as between the railway wheels and the rails can change during varying loading of the working tools. Moreover, the bearing pressure between the rubber wheels and the rails need normally be larger at low temperatures and/or precipitation to achieve satisfactory drive and brake power.

SUMMARY OF THE INVENTION

The object of the present invention is to eliminate problems and disadvantages with previously known railway wheel units for rubber wheeled working machines and provide a device which is capable of automatically positioning the railway wheels of the railway wheel unit such that a satisfactory apportionment of the bearing pressure between the rubber wheels and the rails as well as between the railway wheels and the rails can be maintained.

Accordingly, the basis of the invention is the insight that the above object may be achieved by providing the working machine with a regulating device, which acts on at least one of the railway wheel units and which comprises a position regulating device, which is capable of automatically regulating the position of the railway wheels in relation to the working machine and to maintain these on a predetermined perpendicular or orthogonal distance from some arbitrary reference point on the chassis of the working machine in a direction which represents the vertical direction when the machine is standing on a horizontal ground. By a suitable choice of the perpendicular distance in the vertical direction of the railway wheels from the reference point, it can be ensured that the working machine during changing operating conditions always has sufficient guidance from the railway wheels to stay on the railway track at the same time as the bearing pressure of the rubber wheels is sufficient large to achieve sufficient drive and braking effect. It is also possible to set the distance such that an as large part as possible of the weight of the working machine is carried by the railway wheels, under consideration of sufficient drive and braking effect from the rubber wheels, in order to lower the wear on the rubber wheels. A great advantage with the invention is that it eliminates the problems that the power generating means, which are utilized to raise and lower the railway wheels, and which normally are constituted of hydraulic cylinders, tend to change their position and/or compressive force during time, e.g. as a consequence of leaking valves and cylinders in the hydraulic system, which earlier has lead to that operators of such working machines has been forced to give time and attention to manually and frequently see to that the railway wheels bear with a sufficient large pressure against the rails. Such manually regulating, which is entirely based on feeling and experience, represent a security risk in case the operator should set the pressure wrongly or simply forget to make this manually regulation, and implies also that time and attention is taken from the actual work that should be performed with the working machine along the railway track. With a working machine designed according to the invention the regulating of the railway wheels can be transferred to the automatic regulating device, which has to result that the security will be increased and more time and attention can be devoted to the actual work.

Within the scope of this overall inventive idea the invention can be modified and varied in many different ways. In a hereinafter described exemplary embodiment, the invention is applied on a so called tractor loader or excavator loader, but it is evident that it also could be applied to many other types of working machines, such as for example a truck, a forest machine, a loader or an excavator. Moreover, it is evident that the working machine has to be provided with a railway wheel unit at the forward as well as at the rearward end. However, it is within the scope of the invention that both of these railway wheel units do not have to be controllable by a regulating device according to the invention. Instead, it could be conceivable that one of the railway wheel units could be fixedly settable, preferably in some selectable fixed positions, while the other railway wheel unit is controllable by a regulating device according to the invention. Moreover, it is preferred that the regulating device is controlled by some form of computer device, which is advantageous not at least from a cost point of view and makes the regulating device more adaptable to different types of machines and working conditions. However, it would also be possible to design the regulating device to function purely mechanically and/or hydraulically.

In one embodiment of the invention, and as is also described in the following exemplary embodiment, the regulating device besides a position regulating device also comprises a power regulating device, which is capable of regulating the force by which the railway wheels are forced towards the rails. Preferably, the position regulating device may then define a distance interval having a maximum and a minimum value for the distance of the railway wheels from the reference point. As long as the railway wheels are within the distance interval defined by the position regulating device, the regulating of the railway wheels is performed on the basis of a preset power value, which is monitored by means of some suitable power sensor or power gauge, while the position regulating device defines and limits the largest and smallest distance from the reference point. Normally, hydraulic cylinders are utilized to operate the railway wheel units and in such cases it is natural that as a power sensor utilize a pressure sensor or a pressure gauge, which measures the hydraulic pressure in each hydraulic cylinder. Instead of a power generating means in form of hydraulic cylinders it would, at least theoretically, be possible to use e.g. pneumatic cylinders or electrically driven screws. Pneumatic cylinders are however not preferred in heavy machines and have also the characteristic that they are somewhat resilient, which may be a disadvantage. Electrically driven screws, on the other hand, have the disadvantage that it is difficult to provide these with a suitable power sensor to a reasonable cost which in such case have to be realized by some form of weighing device.

In the embodiment hereinafter described, both of the railway wheel units are provided with two rotatable railway wheels, which are interconnected by a shaft and which are pivotally mounted to the chassis of the working machine by means of two pivot arms, on the one hand in the area of the supporting legs in the rearward end of the excavator loader, and on the other hand in the area of the forward wheel shaft in the front end. This suspension of the railway wheel unit in the front end is novel in relation to prior art with regard to excavator loaders since the forward railway wheel unit earlier has been mounted on the loading arms for the front bucket, which has been a disadvantage since thereby it is not possible to use the front bucket during work along a railway track. In the exemplary embodiment the position sensors for the position of the railway wheel units are angle sensors, which detect the rotational angle at the pivot joint for the pivot arms. Emanating from this rotational angle it is possible to calculate the perpendicular distance of the railway wheels in the vertical direction from the pivot joints of the pivot arms which in this case might serve as reference points on the chassis of the working machine. Normally it is sufficient to have one angle sensor at only one of the pivot arms of the respective railway wheel unit. However, it is to be understood that also many other types of position sensors could be applicable within the scope of the invention, e.g. a laser measuring device or a sensor for measuring the extended length of the hydraulic cylinders. It should also be understood that each railway wheel unit may have more than two wheels, e.g. four wheels in form of a bogie, as well as that the number of power generating means that operate each railway wheel unit may be arbitrary and does not absolutely have to be precisely two as in the embodiment disclosed. It should also be understood that the railway wheel units may be movable upwards and downwards also in other ways than by pivot arms which are pivotally connected to the chassis of the working machine. For example, it could be conceivable to have the railway wheels displaceable arranged upwards and downwards along some form of guides.

BRIEF DESCRIPTION OF THE DRAWINGS

The invention will hereinafter be described with reference to the accompanying drawings, in which.

DETAILED DESCRIPTION OF AN EMBODIMENT OF THE INVENTION

Figure 1:
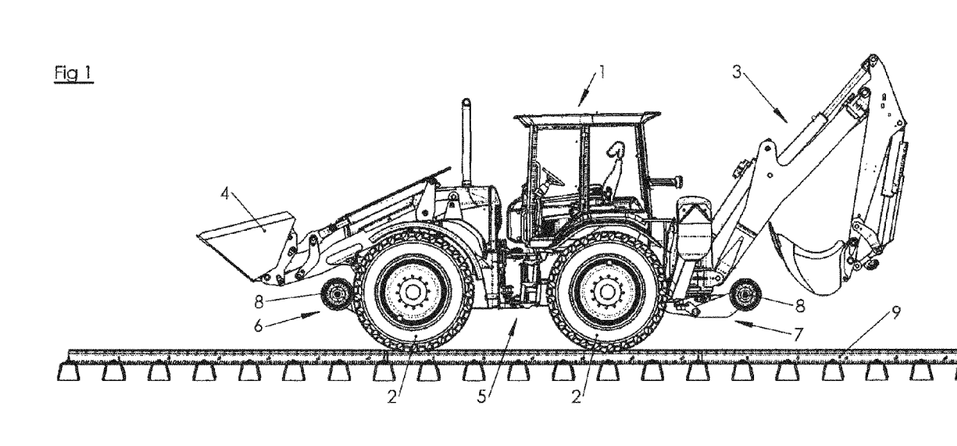
FIG. 1 is an elevation from one side of an excavator loader on a railway track having the railway wheels elevated.

The working machine being disclosed in the following description is a so called excavator loader or tractor loader, which is provided with a operator's compartment 1 and four rubber wheels 2, by means of which the machine can be driven on roads and in the terrain. The machine is moreover provided with en excavator assembly 3 in a rear end and a loading bucket 4 mounted on lifting arms in a front end. The excavator loader shown is designed with an articulated frame steering 5 but could have any other arbitrary kind of steering. In the forward end the machine is provided with a forward railway wheel unit 6 and in the rearward end with a rearward railway wheel unit 7, which each carries two railway wheels 8. In FIG. 1 the excavator loader is shown driven up on a railway track such that the rubber wheels bear against the upper sides of rails 9 of the railway track. In the position shown the forward and the rearward railway wheel units 6, 7, respectively, are however not lowered towards the rails 9 and the figure can be considered to illustrate a position when the excavator loader has just been driven up on the railway track and immediately before the railway wheel units should be lowered towards the rails.

Figure 2:
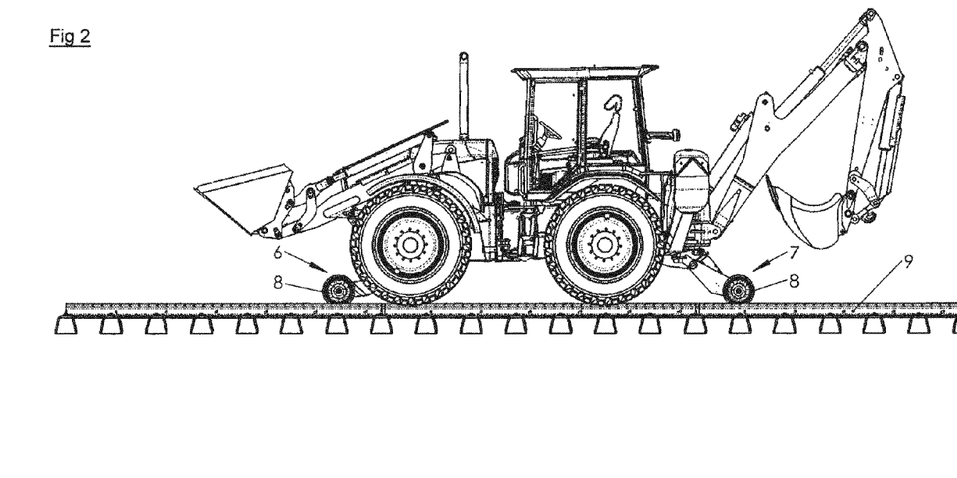
FIG. 2 is an elevation from one side according to FIG. 1 with the railway wheels lowered.

In FIG. 2, the same machine is illustrated with the railway wheel units 6, 7 lowered such that the railway wheels 8 bear against the upper sides of the rails 9. In this position, the railway wheel units will guide and partially carry the machine along the railway track if the bearing pressure between the railway wheels and the rails is sufficient large.

Figure 3:
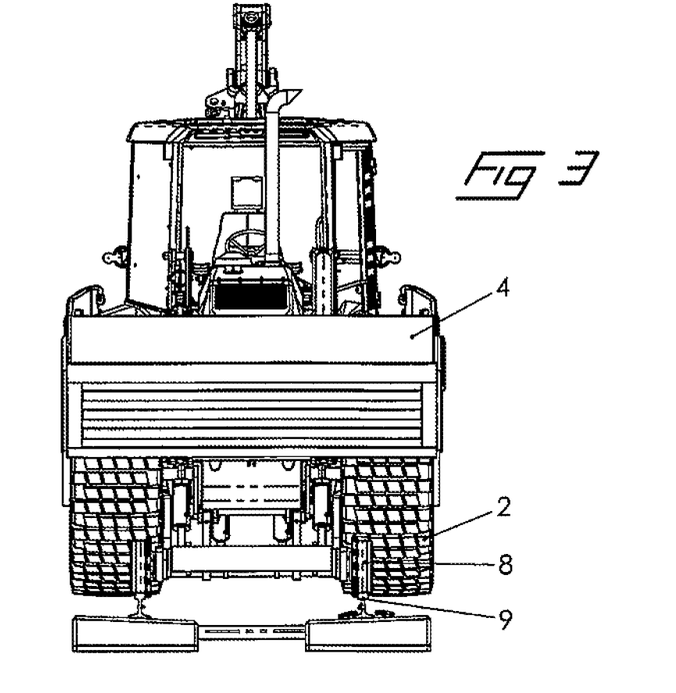
FIG. 3 is a front view of the excavator loader according to FIGS. 1 and 2.
Figure 4:
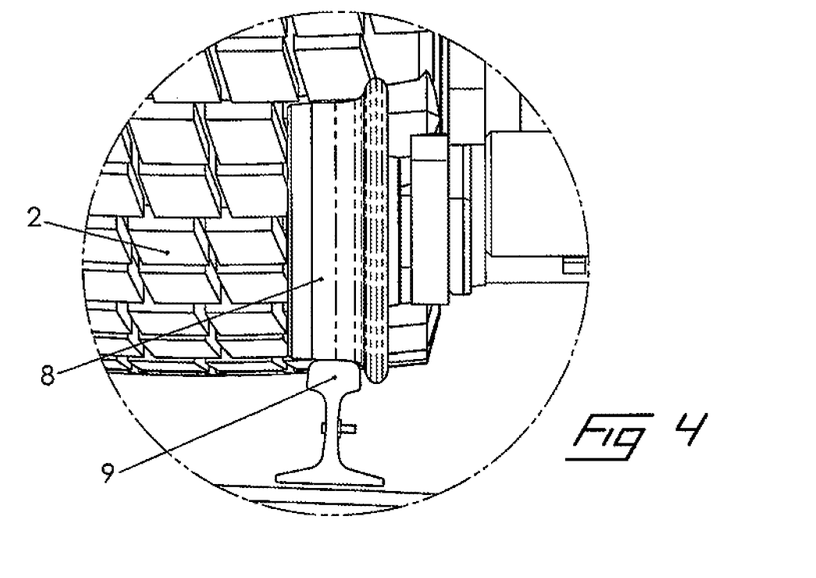
FIG. 4 is en enlarged view of a rubber wheel, a railway wheel and a rail according to FIG. 3.

The view from the front according to FIG. 3 and the detailed enlargement according to FIG. 4 show the excavator loader standing on the rails 9 with the rubber wheels 2 as well as the railway wheels 8 bearing against the upper sides of the rails. The latter view gives a good understanding of how small the bearing surface between the rubber wheels and the rails is and the need for load-relieving for the rubber wheels 2 from the railway wheels 8 in order to lower the wear. At the same time the bearing pressure between the rubber wheels and the rails has to be sufficient large in order to give sufficient driving and braking effect, which has to result that the optimal regulating space, which gives an acceptable driving and braking effect as well as low wheel wearing, becomes very narrow.

Figures 5, 6:
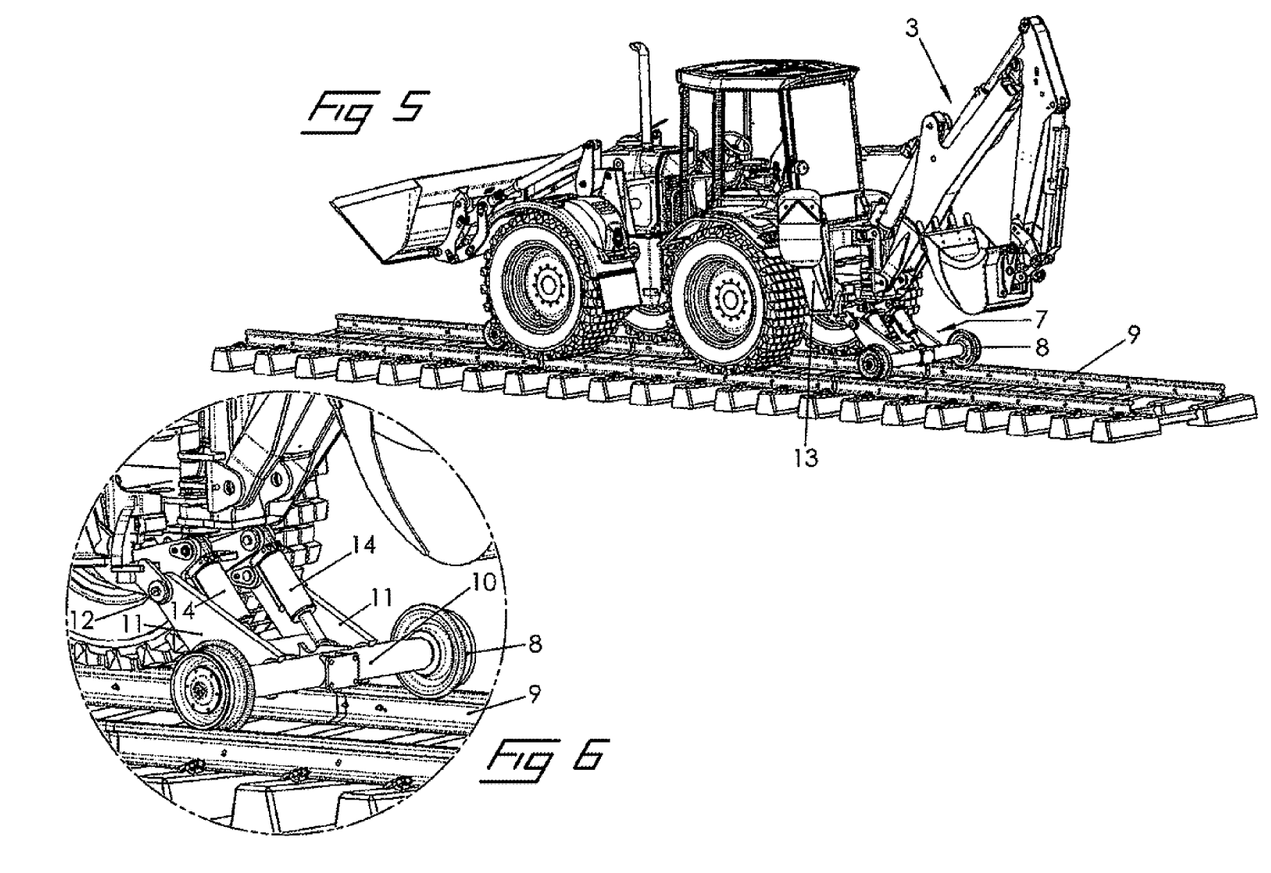
FIG. 5 is a perspective view obliquely from behind of the excavator loader having the railway wheels lowered.
FIG. 6 is an enlarged perspective view of the rearward railway wheel unit and its attachment in the rearward end of the excavator loader.

Next, reference is made to FIGS. 5 and 6 in which the excavator loader is shown in perspective views obliquely from behind and a detailed enlargement of the rearward railway wheel unit 7 and its connection to the rearward end of the excavator loader. As is evident, the railway wheel unit comprises two railway wheels 8, which are connected through a shaft 10 and the shaft is in its turn by means of pivot arms 11 pivotally connected to the chassis of the excavator loader via pivot joints 12 in the area of supporting legs 13 of the excavator loader which are utilized to stabilize the machine during working with the excavator assembly 3. For control of the railway wheel unit two hydraulic cylinders 14 are provided between the railway wheel unit and the chassis of the excavator loader.

Figures 7, 8:
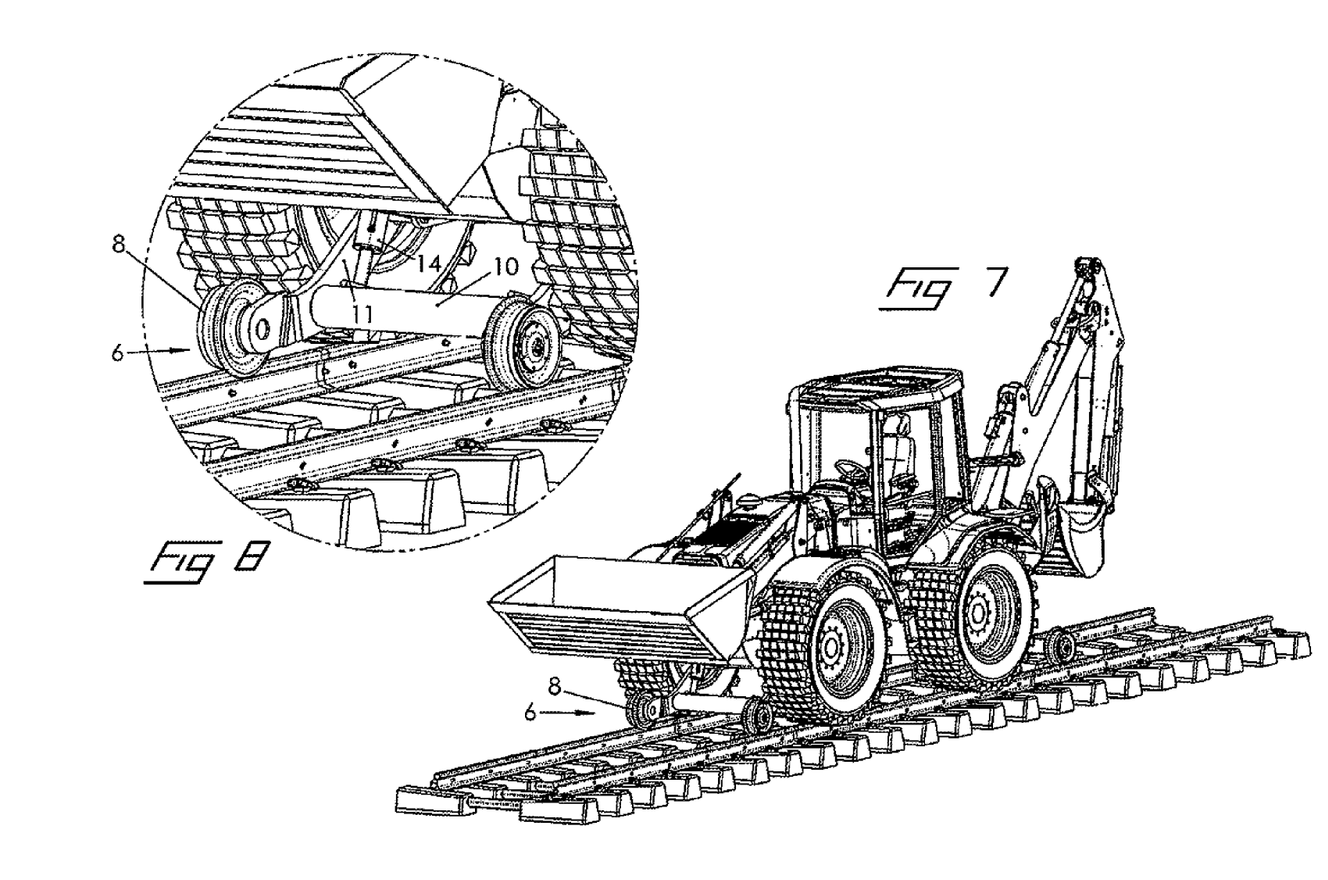
FIG. 7 is a perspective view obliquely from the front of the excavator loader having the railway wheels lowered.
FIG. 8 is an enlarged perspective view of the forward railway wheel unit and its attachment in the forward end of the machine.

In a corresponding way the forward railway wheel unit 6 is provided in the forward end of the excavator loader, as is illustrated in a perspective view obliquely from the front, according to FIG. 7, and the detailed enlargement according to FIG. 8. Also this railway wheel unit comprises two railway wheels 8, which are connected by a shaft 10 and is by means of two pivot arms 11 pivotally connected via a pivot joint (not shown) to the chassis of the excavator loader in the area of its forward wheel shaft and is controllable by means of two hydraulic cylinders 14, of which only one is visible in the drawings. A difference between this railway wheel unit 6 and the rearward railway wheel unit 7 is that the shaft 10, which connects the railway wheels, is not positioned right in front of the rotational centre for the railway wheels at the forward railway wheel unit, but is offset slightly backwards. This is done to minimize the risk for a collision between the forward railway wheel unit 6 and the loading bucket 4 and/or its lifting arms. Instead, the loading bucket should be able to be operated normally while driving the excavator loader along a railway track when the forward railway wheel unit is lowered to bear against the rails.

Figure 9:
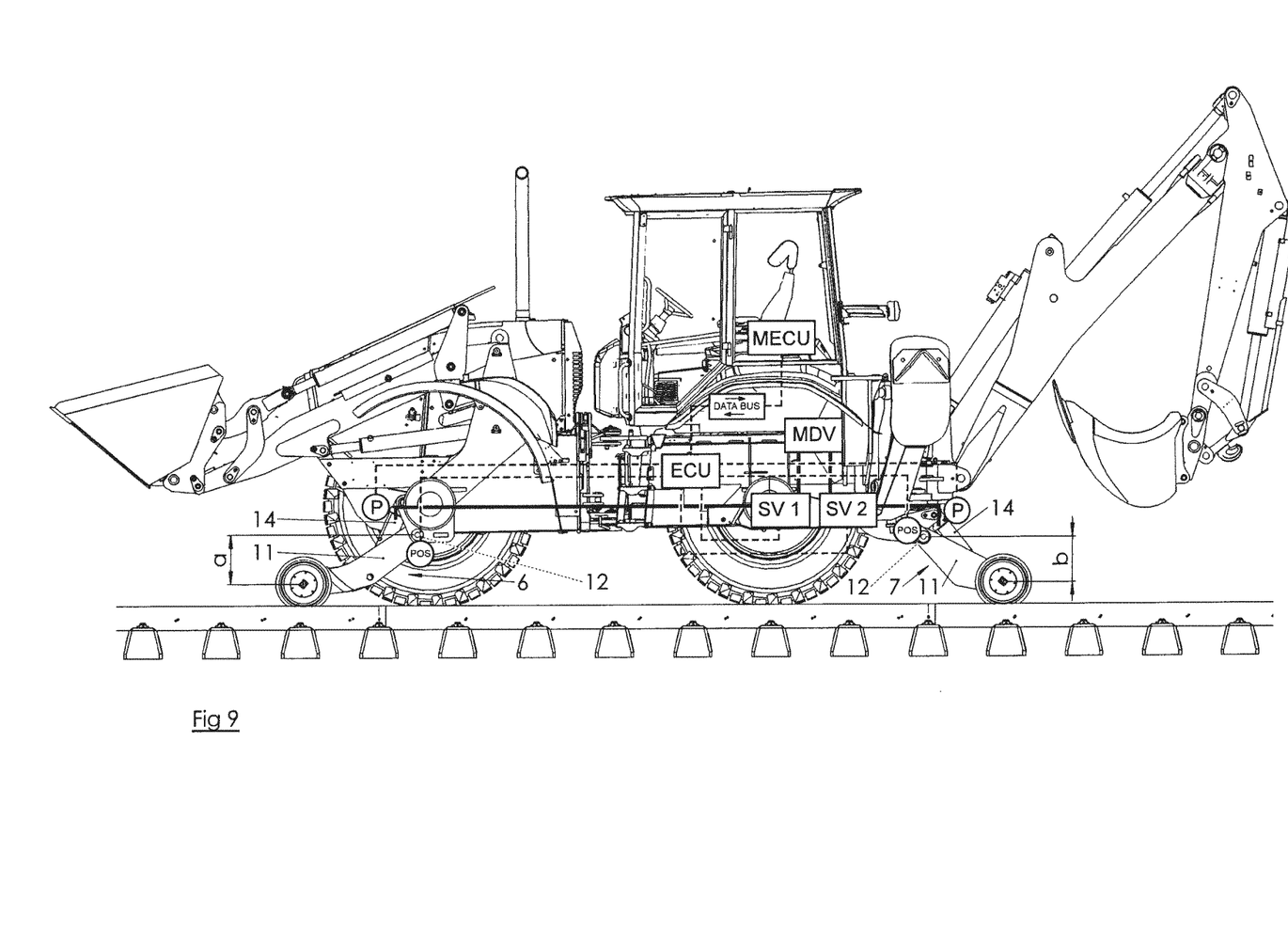
FIG. 9 is a side view of the excavator loader and a schematic circuit diagram for a regulating device, which controls the position and bearing pressure of the railway wheel units.

Thereafter, reference is made to FIG. 9, in which is schematically illustrated a regulating device, according to the invention, for automatically regulating the railway wheel units 6, 7. Each of the railway wheel units 6, 7 is provided with a position sensor or position gauge POS and a pressure sensor or pressure gauge P. At the embodiment illustrated the position sensors are in form of angle sensors, which detect the rotated angle positions of the pivot arms 11 at the pivot joints 12 between the pivot arms and the chassis of the machine, while the pressure sensors P detect the hydraulic pressure in the hydraulic cylinders 14, which controls the railway wheel units. Each of the position sensors POS and the pressure sensors P is electrically connected to an electric control unit ECU in form of a controlling computer. For operating the railway wheel units 6, 7, their hydraulic cylinders 14 are connected by means of hydraulic lines to the regular hydraulic system (not shown) of the excavator loader via electrically controllable direction valves SV1 and SV2, respectively, and a main direction valve MDV. The direction valves SV1 and SV2 are in their turn electrically connected to and are controlled by means of the electric control unit ECU. A communication unit DATABUS connects the electric control unit ECU to the regular main electric control unit MECU of the excavator loader such that different functions of the excavator loader can be coordinated. The illustrated and described regulating device is made as an attachment, which can be subsequently mounted on existing machines and be coordinated with their regular electric and hydraulic systems. However, it would naturally be possible to provide the working machine already at the manufacturing with such a regulating device, which is integrated with the regular electric and hydraulic control systems of the machine such that e.g. the electric control unit ECU is integrated with the main electric control unit MECU.

When the excavator loader is to be driven along a railway track, the operator drives the machine up onto the railway track such that its rubber wheels 2 bear against the upper sides of the rails 9. Thereafter, the operator can lower the respective railway wheel unit against the rails, by means of e.g. manually regulating of the direction valves SV1 and SV2 and subsequently when the railway wheels bear against the rails, the operator may chose automatic regulating of the railway wheel units via some form of not shown control panel. Preferably, the regulating device can be so designed that there are some different preset operating alternatives to chose between depending on different external operating conditions, such as temperature, possible precipitation, expected load on the machine and the like, which in practice gives different distance ranges of the position regulating device and/or different pressure ranges of the pressure regulating device. If automatic regulating is selected, the regulating will be taken over by the electric control unit which, based on the selections that has been made by the operator via the control panel, will define a largest and a smallest perpendicular distance a, b in the vertical direction of the forward as well as of the rearward railway wheels 8 of the railway wheel units 6, 7 from the reference points, which in the embodiment disclosed are represented by the pivot joints 12 of the pivot arms 11 on the chassis of the machine. This distance range is monitored by the electric control unit ECU via the position sensors POS and as long as the railway wheels of the railway wheel units are within this distance range, the railway wheels are regulated to maintain a predetermined bearing pressure against the rails by means of the electric control unit ECU, which monitors the bearing pressure via the pressure sensors on the hydraulic cylinders 14. The perpendicular distances a and b in the vertical direction of the railway wheels of the forward and rearward railway wheel units 6, 7 from the reference points 12 may in many cases have the same magnitude. However, they can also differ, for example when the reference points are positioned on different levels or when it is desirable to have a higher bearing pressure from either of the wheel pairs against the rails. Suitably, the regulating device may comprise some form of delay or damping such that vibrations, as a result of e.g. driving along the railway track or working with the excavator assembly 3 or the bucket 4, should cause continuous or frequent regulating of the position of the railway wheels in relation to the reference point and/or the bearing pressure against the rails.

The invention claimed is:

1. A regulating device for a working machine including at least four rubber wheels, of which at least two are drivable, for driving of the working machine on roads and in terrain, and a railway wheel unit in the area of each of a forward and rearward end, respectively, of the working machine, each railway wheel unit including at least two railway wheels of which at least one is raiseable and lowerable via at least one hydraulic cylinder to allow raising of the railway wheel unit, a pivot arm pivotally fixed at one end to a chassis of the working machine and attached to a shaft between the at least two railway wheels at another end, and by this to allow driving of the working machine on roads and in terrain by way of the rubber wheels and to allow lowering of the railway wheel unit for bearing of the railway wheels against rails of a railway track during simultaneous bearing of the rubber wheels against the rails for driving of the working machine on the railway track by guiding along the rails by way of the railway wheels and driving and braking against the rails by way of the rubber wheels, the regulating device comprising:

a position regulator, configured to automatically control the hydraulic cylinder, in a driving position, to maintain the railway wheels on a predetermined perpendicular distance from a reference point on a chassis of the working machine in a direction in relation to the working machine which represents a vertical direction when the working machine is positioned on a horizontal ground, such that it is ensured that the working machine, during driving along the railway track, is guided from and to some extent is carried by the railway wheels, while a remaining weight is carried by the rubber wheels such that the rubber wheels bear against the rails with sufficient force and allow driving and braking, respectively, of the working machine against the rails;

a regulating computer, configured to control the hydraulic cylinder in the driving position; and     a position sensor operatively connected to the regulating computer, wherein the position sensor is an angle sensor which detects a rotational angle of the pivot arm.

2. A regulating device according to claim 1, wherein the position sensor detects the distance of the railway wheels from the reference point.

3. A regulating device according to claim 2, further comprising a power regulator, configured to detect and control a force by which the hydraulic cylinder maintains the railway wheels forced against the rails and configured to automatically maintain the force within a predetermined maximum and minimum value.

4. A regulating device according to claim 3, further comprising a power sensor by which the regulating computer detects a bearing force of the railway wheels against the rails.

5. A regulating device according to claim 1, wherein the position regulator defines a distance range having a maximum and a minimum value for the position of the railway wheels in relation to the reference point, and wherein, within the distance range, the power regulator being configured to control the bearing force of the railway wheels against the rails.

6. A regulating device according to claim 1, wherein the the power regulator is configured to detect and control the hydraulic pressure in the hydraulic cylinder.

7. A railway wheel device adapted to be mounted on a working machine, including at least four rubber wheels of which at least two are drivable, for driving the working machine on road and in terrain, the railway wheel device comprising:

a railway wheel unit, including at least two railway wheels and adapted to be mounted to be raiseable or lowerable in an area of at least one of a forward and rearward end of the working machine, and     at least one hydraulic cylinder, adapted to be mounted between the working machine and the railway wheel unit, configured to enable raising of the railway wheel unit and allow driving of the working machine on road and in terrain by way of the rubber wheels, and configured to enable lowering the railway wheel unit to bear against rails of a railway track during simultaneous bearing of the rubber wheels against the rails for driving of the working machine on the railway track by guiding along the rails by way of the railway wheels and driving and breaking against the rails by way of the rubber wheels; and     a regulating device according to claim 1.

8. A working machine comprising:

at least four rubber wheels, of which at least two are drivable; and     a railway wheel unit in an area of a forward end of the working machine and a railway wheel unit in an area of a rearward end of the working machine, each of the railway units including at least two railway wheels, wherein at least one of the railway wheel units is movable upwards and downwards by way of at least one hydraulic cylinder to enable raising of the railway wheel device and allow driving of the working machine on road and in terrain by way of the rubber wheels, and to enable lowering of the railway wheel device for the railway wheels to bear against rails of a railway track during simultaneously bearing of the rubber wheels against the rails for driving of the working machine on the railway track by guiding along the rails by way of the railway wheels and driving and braking against the rails by way of the rubber wheels; and     a regulating device according to claim 1.

9. A regulating device according to claim 1, wherein the regulating computer is further configured to calculate a perpendicular distance of the railway wheels in the vertical direction from a pivot joint of the pivot arm.

10. A method for regulating a railway wheel unit including at least two railway wheels, a shaft between the at least two railway wheels and a pivot arm attached at one end to the shaft and pivotally fixed at another end to a chassis of a working machine, and adapted to be mounted, in a vertically adjustable way, in an area of at least one of a forward and rearward end of the working machine, and including at least one hydraulic cylinder, adapted to be mounted between the working machine and the railway wheel unit to enable raising of the railway wheel unit to allow driving of the working machine on road and in terrain by way of rubber wheels, and to enable lowering of the railway wheel unit to bear the railway wheels against rails of a railway track during simultaneously bearing of the rubber wheels against the rails for driving of the working machine on the railway track by guiding along the rails by way of the railway wheels, and driving and braking against the rails by way of the rubber wheels, of the method comprising:

automatically regulating, in a driving state, the hydraulic cylinder to maintain, by way of a position regulator, the railway wheels on a predetermined perpendicular distance from a reference point on the chassis of the working machine in a direction in relation to the working machine which is the vertical direction when the working machine is placed on a horizontal ground by determining a rotational angle of the pivot arm to calculate a perpendicular distance of the railway wheels in the vertical direction from a pivot joint of the pivot arm; and     controlling the hydraulic cylinder in the driving position based on the calculated distance such that the working machine, during driving along the railway track, is guided by and to a certain extent is carried by the railway wheels, while a remaining weight is carried by the rubber wheels such that the rubber wheels bear against the rails with a sufficient force to enable driving and braking of the working machine against the rails.

11. A method according to claim 10, further comprising: detecting, by way of a power regulator, a force by which the hydraulic cylinder maintains the railway wheels forced against the rails and automatically maintains the force within a predetermined maximum and minimum value.

12. A method according to claim 11, further comprising: defining, by way of the position regulator, a distance range having a maximum and a minimum value for the distance of the railway wheels in the vertical direction from the reference point, and within the distance range, allowing the power regulator to control the bearing pressure of the railway wheels against the rails.

* * * * *